April 4, 1967 R. C. PARKES 3,312,334
CONVEYOR
Filed June 29, 1965 2 Sheets-Sheet 1
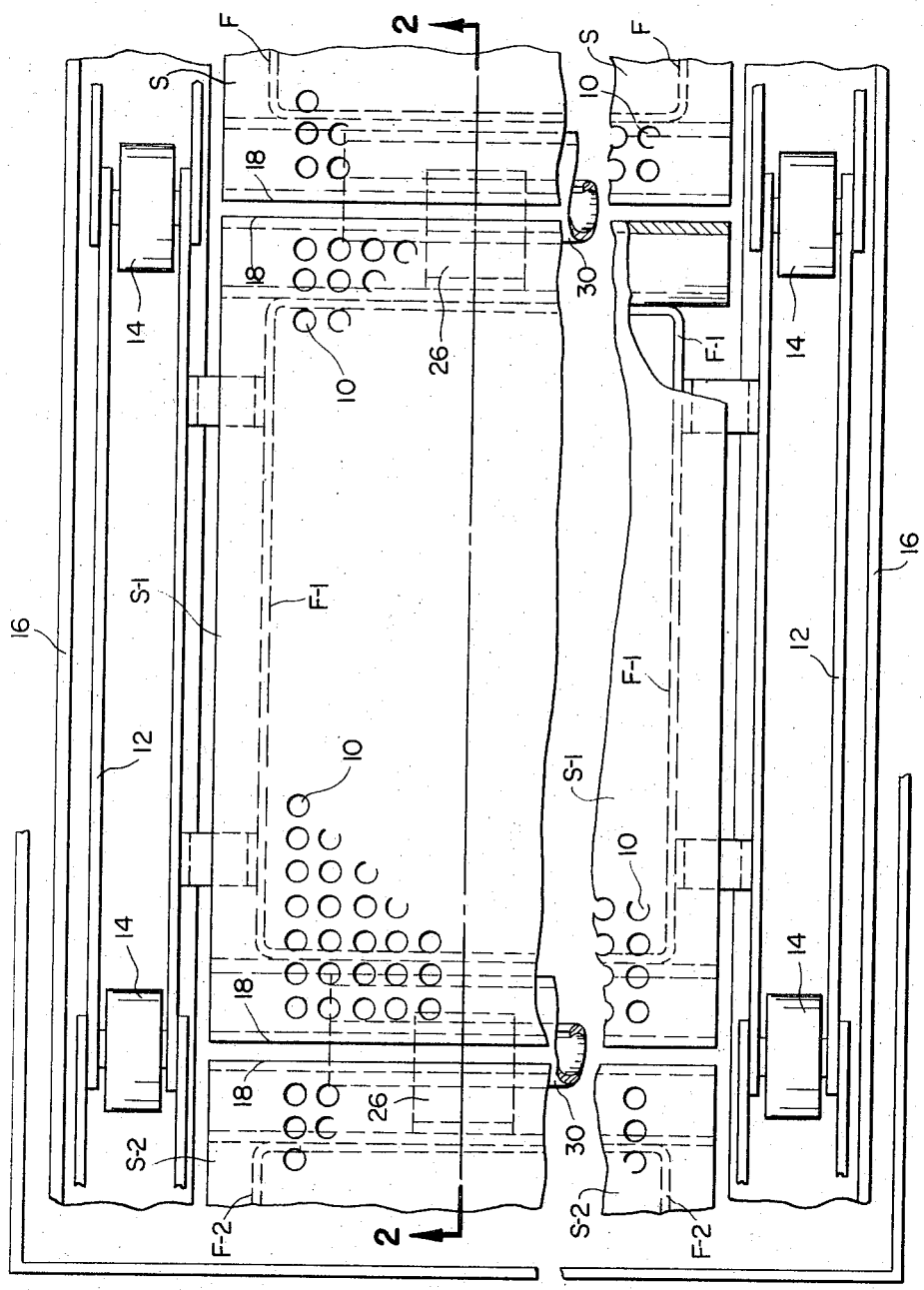
FIG. -1-
INVENTOR.
RALPH C. PARKES
BY
ATTORNEY April 4, 1967 R. C. PARKES 3,312,334
CONVEYOR
Filed June 29, 1965 2 Sheets-Sheet 2
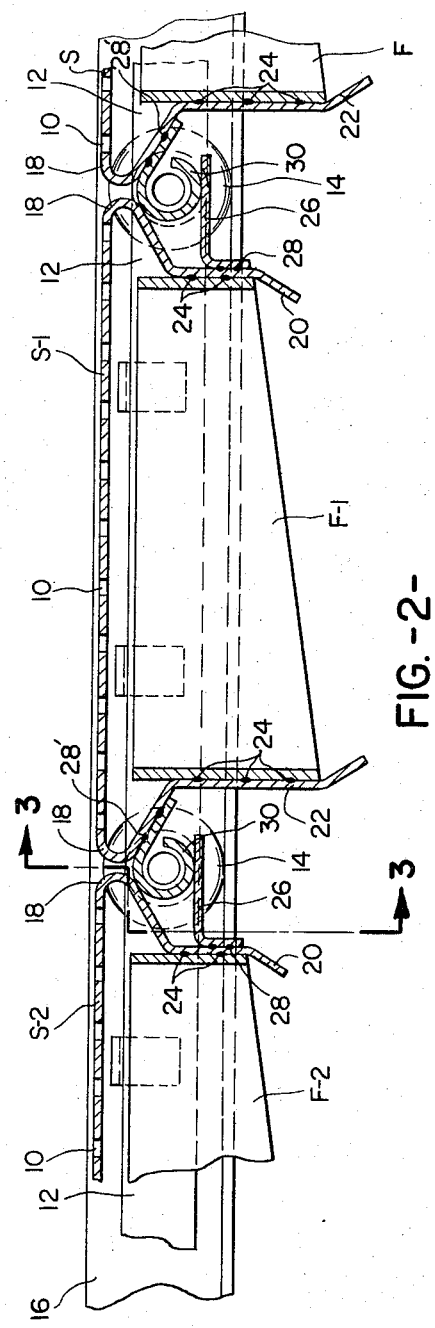
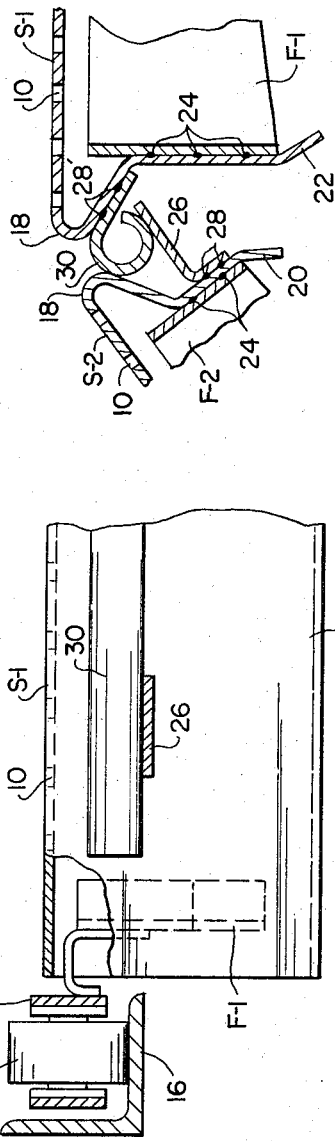
INVENTOR.
RALPH C. PARKES

United States Patent Office 3,312,334
Patented Apr. 4, 1967

3,312,334
CONVEYOR
Ralph C. Parkes, Rydall, Pa.
(2701 N. Hancock St., Philadelphia, Pa. 19133)
Filed June 29, 1965, Ser. No. 467,968
1 Claim. (Cl. 198—195)

This invention relates to a conveyor of the general type set forth in Patent No. 3,191,757.

Because the various parts of the conveyor disclosed in said application may be of different sizes and of materials having different coefficients of expansion and contraction; and because they may be subjected to relatively high temperatures and to radical heat-fluctuations, it was necessary, to avoid buckling or other damage, that the material receiving bed be made freely movable relative to its supporting frame. To accomplish this, the leading and trailing ends of the frames were provided with oppositely facing U-shaped brackets into which the leading and trailing ends of the perforated bed were inserted. Also, as shown in said application, the articulating mechanism interposed between adjacent frames produced a relatively large gap which was covered by the imperforate U-shaped brackets, above referred to. This meant that the material resting on said imperforate, gap-closing portions of the bed did not dry as quickly and as uniformly as material resting on the perforated portion of the bed.

It is therefore the object of this invention to produce an improved conveyor wherein all of the material to be dried is supported on a uniformly perforated bed or surface to insure uniform drying, or other treatment, of the material being processed.

The full nature of the invention will be understood from the following specification and the accompanying drawings in which:

FIG. 1 is a top plan view of a conveyor embodying this invention.

FIG. 2 is a sectional view looking in the direction of line 2—2 on FIG. 1.

FIG. 3 is a sectional view looking in the direction of line 3—3 on FIG. 2.

FIG. 4 is similar to FIG. 2 but showing the parts as they appear when the conveyor is curving around a sprocket wheel, not shown.

The conveyor illustrated comprises a number of separate material supporting sections S, S-1, S-2, etc., only one complete section S-1, and the trailing end of a leading section S, and the leading end of a trailing section S-2 being shown. Conveyor sections S, S-1, S-2 consist of material receiving beds 10, 10-1, 10-2, and supporting frames F, F-1, F-2. A conveyor formed of the requisite number of sections is propelled endlessly through a drying chamber, or the like, by means of sprocket chains 12 which travel over sprocket wheels, not shown. Chains 12 include rollers 14 which move over supporting and guiding brackets 16 which extend the length of the chamber and are carried by suitable framework not shown. When passing over the sprocket wheels at ends of the chamber, the conveyor sections articulate in the manner shown in FIG. 4 of the present disclosure.

In order to close the gap between adjacent conveyor sections, the leading end of each trailing frame carries a bracket 26 which is welded in position as at 28 and the trailing end of each leading frame carries a generally tubular member 30 which is adapted to rest on bracket 26, while the sections are in motion, as shown in FIGS. 2 and 4.

It will be noted that, in the patent aforesaid, the perforated beds were only coextensive with their respective frames, and that the gaps between adjacent beds were substantially covered, by imperforate elements. See FIG. 3 of the patent aforesaid and FIG. 2 of the present disclosure.

According to the present improvement, the perforated bed of each section is extended beyond the leading and trailing edges of its frame so that the last row of holes at the trailing end of a leading bed will be close to the first row of holes at the leading end of a trailing bed. See FIG. 1 of the patent aforesaid and FIG. 1 of the present disclosure.

By this arrangement, a greater portion of the gap between adjacent frames will be closed by perforated portions of the beds and the material overlying the perforated bed and the gap will be dried substantially uniformly.

It will be noted that the bed of the present invention can be made by cutting and perforating beds 10 of the desired size; by bending their opposite ends to produce aprons 20 and 22, and by spot-welding said aprons to their respective frames. This eliminates the U-shaped members 20 and 22 and bolts 46 of the prior patent and permits ample accommodation of the beds to their frames in response to heat fluctuations.

I claim:
A conveyor for receiving and conveying material, said conveyor including a propelling chain,
a plurality of separate frames secured to said chain at intervals to provide gaps between the trailing ends of leading frames and the leading ends of trailing frames,
a flat material receiving bed carried by each frame, each of said beds being perforated over its entire material receiving surface and being larger than its corresponding frame, measured in the direction of its movement, whereby the perforated trailing end of a leading bed and the perforated leading end of trailing bed coact to substantially cover the gap between their corresponding frames,
each of said beds having a leading extension bent downwardly and rearwardly and secured to the leading end of the corresponding frame, and having a trailing extension bent downwardly and forwardly and secured to the trailing end of said frame,
elongated member attached to each leading extension and a bracket attached to each trailing extension, said elongated member being articulately received between the bracket and each trailing extension thereby providing a bearing surface for each of said trailing extensions.

References Cited by the Examiner

UNITED STATES PATENTS

| | | | |
|---|---|---|---|
| 1,800,432 | 4/1931 | Buck | 198—195 |
| 1,974,129 | 9/1934 | Wasson | 198—194 |
| 2,336,698 | 12/1943 | Morrill | 198—184 X |
| 2,628,705 | 2/1953 | Kline et al. | 198—195 |
| 2,823,790 | 2/1958 | Sifford et al. | 198—195 |
| 3,191,757 | 6/1965 | Parkes et al. | 198—129 |

EVON C. BLUNK, *Primary Examiner.*

R. J. HICKEY, *Assistant Examiner.*